United States Patent Office 3,787,584
Patented Jan. 22, 1974

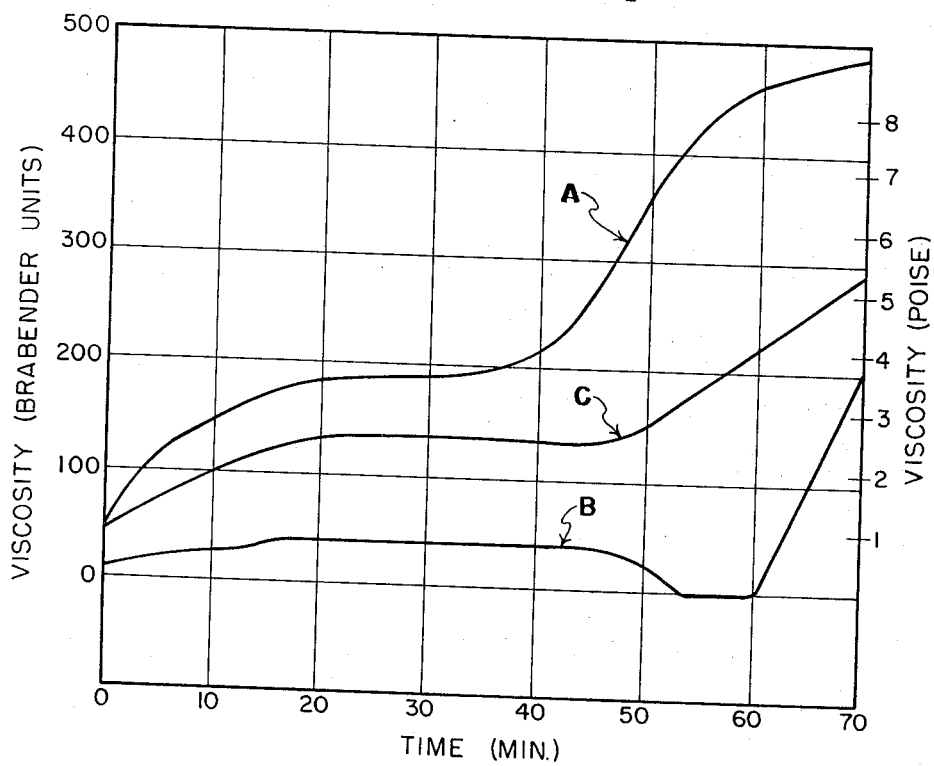

3,787,584
INSTANT GRITS
Roy G. Hyldon, Crystal Lake, Ill., assignor to
The Quaker Oats Company, Chicago, Ill.
Continuation-in-part of application Ser. No. 2,939, Jan. 14, 1970, now Patent No. 3,664,846. This application Nov. 9, 1971, Ser. No. 196,945
The portion of the term of the patent subsequent to May 23, 1989, has been disclaimed
Int. Cl. A23l 1/10
U.S. Cl. 426—208         3 Claims

ABSTRACT OF THE DISCLOSURE

An emulsifier free instant-type corn grits food product produced by the process comprising the steps: (A) admixing corn grits, critical amounts of water, and critical amounts of polysaccharide gum; (B) heating the mixture in a first heating step which consists of a critical temperature range for a critical time period; (C) heating the above heated mixture in a second heating step which consists of a critical temperature range; (D) drying the mixture by forming the heated mixture in a thin sheet on a drum drier with the forming being conducted within a critical time period from the last heating step; and (E) comminuting the cooked, dried sheet.

CROSS-REFERENCES TO RELATED APPLICATIONS

This application is a continuation-in-part of patent application Ser. No. 2,939, filed Jan. 14, 1970, now U.S. Pat. No. 3,664,846.

BACKGROUND OF THE INVENTION

Field of the invention

This invention pertains to an improved instant food product of the corn grits type.

Description of the prior art

My invention constitutes a new and improved instant-type food product. It has heretofore been known that corn grits product which may be prepared as corn grits products to make them "instant" in nature, i.e. not requiring a cooking step by the consumer. Among these additives are the use of polysaccharide gums in processed oats to make instant oatmeal. Inclusion of polysaccharide gums or other additives in normally prepared corn grits products has failed to provide an instant product which would have the characteristics of normally prepared corn grits unless the grits are coprocessed with an emulsifier at a relative high temperature before the drum drying step is reached. When an emulsifier has been used to produce the desired result, the amount of such emulsifier must be carefully controlled depending on the particle size distribution of the corn grits present. My invention provides an instant corn grits with the process for producing it having the advantage of lower temperature processing conditions as well as elimination of a costly emulsifier ingredient.

SUMMARY OF THE INVENTION

It is an object of this invention to produce an instant corn grits product whch may be prepared as corn grits by the mere addition of warm water to the product in a serving bowl.

It is another object of this invention to provide an instant grits product which upon the addition of warm water acquires the texture and flavor characteristics of conventionally cooked corn grits.

It is another object of this invention to produce a corn grits product free of emulsifier.

It is still another object of this invention to provide a new and novel instant corn grits product.

These objects are accomplished by a product produced by the process which comprises admixing corn grits, critical amounts of water, and critical amounts of polysaccharide gum, heating the mixture in a first heating step to a temperature of from 60° C. to 80° C. and maintaining that temperature for a period of time of from 30 seconds to 30 minutes providing, however, that the heating does not "set" the starch, i.e. does not substantially gelatinize the starch; heating the above heated mixture in a second heating step at a temperature of from 93° C. to 100° C. and within two minutes of the time that the second heating step has been accomplished, drying the heated mixture in the form of a thin sheet on a drum drier; and collecting the dried sheet of product and comminuting it to form an instant-type corn grits product.

More particularly, the polysaccharide gum used in this invention must be capable of hydrating rapidly with the addition of water and must be edible. Edible polysaccharide gums include both true gums of vegetable origin and synthetic gums such as carboxymethylcellulose, methyl cellulose, and other cellulose derivatives which approximate the vegetable gums in physical and chemical properties. Both types of gums are acceptable for use in this invention.

"True gums" are gums of vegetable origin which are soluble in water or swell in contact with water to form viscous colloidal solutions. They are insoluble in oils, alcohols, benzene and other organic solvents.

A general classification of such gums is as follows:

(A) Plant gums—dried extrudates from certain trees or shrubs in the form of tears, flakes or annular fragments that have been formed by bark fissures or incisions. The more important ones include acacia (gum arabic), Australian, Cape, carmania, gedda, ghatti, karaya, mesquite, mogadore, Persian, shiraz, talha and tragacanth. Others of lesser importance include amrad, angico, apricot, brea, cashew, cebil, cedar, chagual, cherry, damson, jeol, mango, plum and sassa.

(B) Plant mucilages—derived from seeds, roots or other plant parts usually by extraction with water. This class includes gums derived from althea root, chia seed, Iceland moss, linseed (flaxseed), slippery elm bark and guar gum.

(C) Mucilaginous materials known as hydrophylic colloids obtained from two general groups of brown and red algae. This class includes agar, Irish moss (carrageen) and algin. When the source material for the gum is acidic, i.e. algin and Irish moss, the commercially available edible gum is a derivative of the acid such as a soluble salt or ester, i.e. propylene glycol ester of alginic acid. In general, to be satisfactory, any gum employed must be edible, have no undesirable flavor, and disperse rapidly in hot water.

The concentration of the polysaccharide gum is critical. The polysaccharide gum must be present in an amount of from 0.5 to 3.5 percent by weight of the finished corn grits product and preferably from 1.0 to 3.0 percent by weight of the finished corn grits product.

It is contemplated, alternatively, that mixtures of the aforementioned gums may be employed instead of a single gum as long as the critical levels of gum are maintained.

My new and unique product is produced by my new and unique process which consists of the steps:
 (A) admixing
  (1) corn grits,
  (2) water, said water being added in an amount sufficient to cause the moisture content to be from 50 percent to 90 percent by weight of the total mixture.

(3) an edible polysaccharide gum capable of rehydrating rapidly with the addition of water, said gum being added in an amount of from 0.5 to 3.5 percent by weight of the finished corn grits product;

(B) heating the above mixture in a first heating step, said first heating step comprising heating the mixture to a temperature of from 60° C. to 80° C. and maintaining that temperature for a period of time of from 30 seconds to 30 minutes without setting the starch in the corn grits;

(C) heating the above heated mixture in a second heating step, said second heating step comprising heating the mixture to a temperature of from 93° C. to 100° C.;

(D) drying the heated mixture in the form of a thin sheet on a drum drier, said drying being substantially accomplished within a time period of up to 2 minutes after the mixture has been heated to the 93° C. to 100° C. temperature range; and (E) collecting the dried sheet of product containing discrete particles in a starch-gum matrix and comminuting the dried sheet to form an instant-type corn grits product.

The elimination of an emulsifier in my new process is accomplished by the two step heat treatment procedure prior to placing the product on a drum drier. The first heating step of my process comprises heating the mixture to a temperature of from 60° C. to 80° C., and preferably from 60° C. to just under 71° C., and maintaining that temperature for a period of time of from 30 seconds to 30 minutes without setting the starch in the corn grits. It is necessary that this heat treatment be accomplished within the required temperature range for the required time period before proceeding to the second heating step. If the temperature range is exceeded before the time limitation has been achieved, then the mixture will not have the properties sufficient to allow it to be formed into a thin sheet on a drum drier.

It is also necessary that the first heating step does not "set" the starch in the corn grits. By use of the term "set" I mean a cooking of the starch to the point that it becomes an extremely thick or hardened mass. In other words, the first heating step must not substantially gelatinize the starch.

In the second heating step of my new process, I heat the above heated mixture to a temperature within the range of from 93° C. to 100° C. After the second heating step is accomplished, it is critical that the heated mixture be conveyed immediately, i.e. within a time period of up to two minutes, to a drum drier and substantially dried on the drum drier within the two minute time period. It is to be understood that while some of the grits particles may theoretically never go through the nip of the drum dried, it is only sufficient that a substantial portion, i.e. greater than 80 percent of the mixture, be dried within the two minute time period.

The second heating step of my process may be accomplished in one of two ways. The preferred procedure is to have an independent heating step such as injecting steam into the mixture to raise the temperature to the required temperature range. The heating mixture is then passed immediately to the trough portion of a drum drier and substantially dried within two minutes after the mixture has been heated to the temperature range. An alternate procedure for accomplishing the second heating step of my invention is accomplished by conveying the mixture from the first heating step directly to the trough portion of a drum drier and heating the mixture in the trough portion of the drum drier to the temperature range of from 93° C. to 100° C. and then after a substantial portion of the mixture has been heated to the required temperature range, passing the mixture through the nip of the dried within two minutes of the time that a substantial portion of the mixture has reached the required temperature range.

I have found that any of the commercially available comminuting machines are acceptable for comminuting the cooked and dried sheet of discrete particles in a starch-gum matrix. It is preferred, however, that the comminution be such that the product has the following particle size distribution according to a Ro-Tap particle size distribution analysis:

10 Minutes on Ro-Tap (# refers to U.S. sieve numbers)

(% refers to weight percent)

On a #12: Less than 1%
Through a #12 and on a #16: 17% to 25%
Through a #16 and on a #20: 37% to 43%
Through a #20 and on a #30: 14% to 19%
Through a #30 and on a #40: 4% to 7%
Through a #40: Less than 20%

While the above is a preferred particle size distribution for the comminuted product, any particle size distribution which will give approximately the same hydration rate as the above distribution will be acceptable.

In addition to making my product instant in nature, my unique process has awarded me several other benefits. First, the combination of thickening agent and critical temperature range provides a mixture which will form a sheet on a drum drier. By "drum drier" I intend to mean any endless plate which can be heated from a side opposite the side contacted by the product. A good example of a "drum drier" which may be used in my new process may be found in U.S. Pat. 3,478,439. Normally, one would not attempt to use a drum drier to dry a mixture of discrete particles in a starch-gun matrix. This is so because the discrete particles would cause voids or tears in the attempted sheet, resulting in an uneven mass rather than a thin, continuous and consistent sheet which would be subjected to uniform drying and heat treatment. My unique combination of additives has made possible the drying of the product on a drum drier which gives me the desired properties of my product.

By the term "drying" as used herein, I intend to mean reducing the water content to below 15 percent by weight.

The product, as formed on the drum drier, preferably has a thickness of from 0.015 to 0.030 inch. This can be accomplished by setting the space between the drums at from 0.015 to 0.030 inch.

Another distinct advantage of my process is that it is successful for corn grits from a wide variety of sources. Ordinarily, corn grits vary in makeup (fat content, etc.) depending on the location from which they are produced and the processing employed in making the grits. As a result of this, processes involving corn grits normally require major alteration to adjust to the changes in the grits. I have found, however, that no adjustment is necessary for my process regardless of the size or particle size distribution of the corn grits. While some prior processes have used an emulsifier to overcome problems associated with particle size distribution of the grits, this costly and time consuming step has been made unnecessary by my new and unique process.

Still another advantage of my new combination of additives becomes apparent after the product is prepared for use. When conventional corn grits are prepared in large quantities and stored on a steam table or the like to keep them warm until serving, they soon become an adhesive mass or cake and lose the texture associated with grits. My new process, however, has provided a corn grits product wherein the forming of an adhesive mass or cake is postponed several hours. This results in a product which retains the grits texture for the longest of normal serving times for the product.

By the term "corn grits" in reference to my new improved food product, I intend to refer to particles of the endosperm of corn which have been subdivided to the extend that not less than 95 percent by weight of the particles pass through a No. 10 sieve and not more than 20 percent by weight of the particles pass through a No. 25 sieve.

By the term "instant" in reference to my food product, I intend to refer to a product which can be prepared in a bowl by mere addition of water and without a cooking step by the consumer. I have thus provided a product which eliminates the cooking pan and extensive cooking time required for conventional corn grits. While room temperature water (about 25° C.) can be added to my product to rehydrate it, it is preferred to use boiling water as this requires less time and provides a product at the temperature normally preferred.

The product of my invention is different from the product made by inclusion therein of emulsifiers. This difference is most dramatically illustrated by a comparison of the density of the two products. If the process uses emulsifiers to obtain a product, the volume of a normal 24 gram serving of the grits (before water is added to the bowl) will be about ¼ cup which is a density of about 1536 grams per gallon. The product produced by my new process, however, has a volume of about ⅓ cup for a 24-gram serving which is a density of about 1152 grams per gallon. My new product is therefore about 25% less dense than prior known products.

My new and unique process results in a product which cannot be produced as economically by any other method. Simple mixing of the ingredients fails to produce an acceptable product. Likewise, simple mixing of the ingredients and cooking in a pan or oven fails to produce an acceptable product. Also, my new and unique process eliminates the many problems associated with the necessary inclusion in the prior art of critical amounts of carefully controlled emulsifiers. Therefore, I have invented a new and useful product which can be produced only by my new and unique process.

My new and unique product should have a viscosity of between about 1 poise and about 3.5 poise when mixed with 40° C. water for 20 minutes. Also, while a grits product that includes an emulsifier may require a viscosity of over 3.75 poise before being considered edible, my product is acceptable within the above stated range.

One further advantage of my new and unique product is that it does not have the problems associated with rancidity upon storage at 24 weeks that emulsifier containing products have.

My new and unique product can only be described by relation to the new and unique process which I have discovered. My new product, therefore, may best be described as the product produced by my new process.

BRIEF DESCRIPTION OF THE DRAWING

This invention may be more fully explained by the accompanying drawings in which the product of this invention is compared to the best known prior product.

The enclosed drawing is a graph of the results of a standard Amylograph test. For each test, 60 grams of a corn grits product was added to 440 grams of water. The resulting slurry was quickly added to the cup of an Amylograph-Viscograph, Model GEDC, Brabender Co., Rochelle Park, N.J. The temperature of the grits-water mixture was then increased from room temperature to 40° C. and held at 40° C. until the viscosity showed little or no change (i.e. about 23 minutes total time). At this point, the temperature control was adjusted to increase the temperature at a rate of 1.5° C. per minute. This temperature increase was continued until the temperature reached 96° C., at which point the temperature was held constant. This testing procedure is more fully explained (using different temperatures) in Starch: Chemistry and Technology, Whistler and Paschall, Academic Press, 1967, pages 599–601. The viscosity was recorded via a graphic print-out mechanism and these results are shown in the drawing.

The Amylograph test illustrated by the enclosed drawing shows the exceptional advance made by my invention. In the graph a product made in accordance with this invention (the middle line designated by the letter C) is compared to a product including an emulsifier (the top line designated by the letter A) which was produced in accordance with U.S. Pat. 3,526,512 and was also compared to a prior known product of the "quick" or "1-minute" grits type (the bottom line designated by the letter B). The product produced in accordance with the invention (designated by the letter C) is the product produced in accordance with Example 1 which hereinafter follows. The product designated by the letter A was produced in accordance with Example 1 of the referred to patent. The product designated by the letter B is a sample of "quick" grits obtained from a grocery store shelf.

While normally a product was thought to require a viscosity on the graph of about 175 Brabender units before it was considered edible. I have found that my product is cooked and edible when it has a viscosity on the graph of between 75 and 170 Brabender units. The product of this invention has a very rapid hydration rate as compared to the quick grits and becomes ready to eat in a very short period of time. The quick grits on the other hand, is almost unresponsive to heat and water until it began to cook at about 96° C., i.e. after 60 minutes on the graph. My product on the other hand, becomes ready for consumption within 5 minutes of its mixing with boiling water. It may thus be seen that I have developed an instant corn grits product which can be prepared with hot or boiling water and without additional cooking. It may also be seen that I have provided a product which is instant in nature yet it does not require extremely high viscosity before it is ready for consumption. My product, therefore, accomplishes the advantages of both being instant and of having a viscosity which is low enough to provide a texture highly acceptable to the consumer.

DESCRIPTION OF PREFERRED EMBODIMENTS

This invention will be further illustrated but is not limited by the following examples and preferred embodiment. Example 1 may be taken to constitute the preferred embodiment of my invention.

EXAMPLE 1

One hundred parts by weight water was heated to 180° C. 50 parts by weight corn grits and 0.028 part by weight carboxymethylcellulose (CMC 7HOF, Hercules, Inc.) were added to the water. Prior to the addition, the corn grits had a particle size such that 17 percent by weight of the grits passed through a U.S. No. 25 screen. The resulting mixture of water, corn grits, and carboxymethylcellulose had a temperature of just under 70° C. This temperature was held constant for about minutes. The heated mixture was then conveyed through a screw conveyor which had been fitted with steam ports and steam was injected into the mixture until its temperature was 95° C. The mixture was taken from the screw conveyor and immediately placed in the trough portion of a drum drier. Within 2 minutes of the time that the mixture reached 95° C. substantially all of the mixture had passed through the nip of the drier. The heated mixture then formed a thin sheet on the internally-heated, rotating double drum drier. The product was then removed in a thin sheet having a thickness of about 0.025 inch and comminuted to the particle size of corn grits.

EXAMPLE 2

Example 1 was repeated with the exception that the polysaccharide gum was guar gum (Jaguar J2S1, Stein, Hall and Co., Inc.).

While carboxymethylcellulose and guar gum are the only gums illustrated in my examples, it is to be understood that any of the aforementioned polysaccharide gums or combinations thereof can be substituted for the gums illustrated by way of example.

The products of Examples 1 and 2 were tested as instant corn grits by employing the following recipe:

Place ⅓ cup (about 24.0 grams) of the corn grits product of this invention in a bowl. Pour ½ cup water (preferably boiling) over the product and stir until blended. Season to taste. In each of the above cases, the products were found to have the taste and texture characteristics of normally prepared corn grits. Examples 1 and 2 are in accordance with this invention.

EXAMPLE 3

Example 1 was repeated except the polysaccharide gum was left out. The product would not form a sheet on the drum drier.

EXAMPLE 4

Example 1 was repeated except the temperature of the grits-water-thickening agent mixture was held at 90° C. for 10 minutes before the mixture was placed on the drum drier. The product became so thick that it would not form a sheet on the drier, and consequently an acceptable product was not produced.

Examples 3 and 4 are not in accordance with this invention and are advanced merely to illustrate the criticality of the polysaccharide gum and processing temperature range.

It may thus be seen that I have invented a new and unique process which produces a new and useful product and which overcomes the problems left unsolved by the prior art. Therefore,

I claim:

1. An emulsifier free, instant-type food product which upon the addition of water and without need for heating to boiling temperatures acquires the flavor and texture characteristics of cooked corn grits, said product having a thickness of from 0.015 to 0.030 inch and having rehydratability characteristics such that it has a viscosity of between about 1 poise and about 3.5 poise when mixed with water, in the ratio of 60 grams grits product to 440 grams water, at 40° C. for 20 minutes, said product produced by the process consisting of the steps:

(a) admixing
      (1) corn grits,
      (2) water, said water being added in an amount sufficient to cause the moisture content to be from 50 percent to 90 percent by weight of the total mixture,
      (3) an edible polysaccharide gum capable of rehydrating rapidly with the addition of water, said gum being added in an amount of from 0.5 to 3.5 percent by weight of the finished corn grits product;
   (b) heating the above mixture in a first heating step, said first heating step comprising heating the mixture to a temperature of from 60° C. to 80° C. and maintaining that temperature for a period of time of from 30 seconds to 30 minutes without substantially gelatinizing the starch in the corn grits;
   (c) heating the above heated mixture in a second heating step, said second heating step comprising heating the mixture to a temperature of from 93° C. to 100° C.;
   (d) drying the heated mixture in the form of a thin sheet on a drum drier, said drying being substantially accomplished within a time period of up to 2 minutes after the mixture has been heated to the 93° C. to 100° C. temperature range; and
   (e) collecting the dried sheet of product containing discrete particles in a starch-gum matrix and comminuting the dried sheet to form an instant-type corn grits product.

2. A product according to claim 1 wherein the edible polysaccharide gum that is added is carboxymethylcellulose.

3. A product according to claim 1 wherein the edible gum that is added is guar gum.

References Cited
UNITED STATES PATENTS

| | | | |
|---|---|---|---|
| 3,664,846 | 5/1972 | Hyldon | 99—83 |
| 3,526,512 | 9/1970 | Collins et al. | 99—83 |
| 3,677,768 | 7/1972 | Mokrzycki et al. | 99—83 |

RAYMOND N. JONES, Primary Examiner

U.S. Cl. X.R.

426—215, 367

UNITED STATES PATENT OFFICE
CERTIFICATE OF CORRECTION

Patent No. 3,787,584          Dated January 22, 1974

Inventor(s) Roy G. Hyldon

It is certified that error appears in the above-identified patent and that said Letters Patent are hereby corrected as shown below:

Column 1, line 42, delete "corn grits products which may be prepared as corn grit products" should read --certain additives can be added to cooked and dried grain products--; Column 3, line 43, after "set", second occurrence --with regards to the starch in the corn grits, I intend--.

Signed and sealed this 23rd day of April 1974.

(SEAL)
Attest:

EDWARD M. FLETCHER, JR.                C. MARSHALL DANN
Attesting Officer                      Commissioner of Patents